(12) United States Patent
Phillips et al.

(10) Patent No.: US 9,057,534 B2
(45) Date of Patent: *Jun. 16, 2015

(54) MODULAR CONTROL SYSTEM AND METHOD FOR WATER HEATERS

(71) Applicant: A. O. SMITH CORPORATION, Milwaukee, WI (US)

(72) Inventors: Terry G. Phillips, Meridianville, AL (US); Wade C. Patterson, Hunstville, AL (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,739

(22) Filed: Feb. 25, 2014

(65) Prior Publication Data

US 2014/0175183 A1  Jun. 26, 2014

Related U.S. Application Data

(63) Continuation of application No. 11/692,182, filed on Mar. 27, 2007, now Pat. No. 8,660,701, which is a continuation-in-part of application No. 11/201,665, filed on Aug. 11, 2005, now Pat. No. 7,613,855.

(60) Provisional application No. 60/604,689, filed on Aug. 26, 2004, provisional application No. 60/908,132, filed on Mar. 26, 2007.

(51) Int. Cl.
*G05B 13/00* (2006.01)
*F24H 9/00* (2006.01)
*F24H 9/20* (2006.01)

(52) U.S. Cl.
CPC .............. *F24H 9/0005* (2013.01); *F24H 9/2014* (2013.01)

(58) Field of Classification Search
CPC ............ F24D 19/1051; F24D 19/1057; F24H 9/2021; F24H 1/201; H02J 3/14; H02J 3/28
USPC ............ 700/86, 275, 299; 710/2, 62, 72, 312; 307/149; 219/481, 490, 492, 494, 497, 219/501, 508, 510
See application file for complete search history.

(56) References Cited

U.S. PATENT DOCUMENTS 2,575,150 A 11/1951 Wellman
2,686,031 A 8/1954 Bolesky
(Continued)

FOREIGN PATENT DOCUMENTS

WO 03/044610 5/2003
WO 2007/100318 9/2007

OTHER PUBLICATIONS

Canadian Patent Office Action for Application No. 2,517,051 dated Dec. 2, 2011 (2 pages).
(Continued)

*Primary Examiner* — Mohammad Ali
*Assistant Examiner* — Sheela S Rao
(74) *Attorney, Agent, or Firm* — Michael Best & Friedrich LLP

(57) ABSTRACT

A water heating system includes a tank, one or more heating elements mounted on the water heating system, and a first controller mounted on the tank. The first controller is coupled to the one or more heating elements and includes logic to activate and deactivate the heating elements according to a first threshold value. The water heater also includes a second controller that is selectively coupled to the first controller and configured to communicate the first threshold value to the first controller, and perform an additional function related to the operation of the water heater. The first controller is configured to receive the first threshold value from the second controller and control the one or more heating elements based on the received threshold value, and to control the one or more heating elements mounted on the water heating system in a physical absence of the second controller.

20 Claims, 9 Drawing Sheets

(56) References Cited

U.S. PATENT DOCUMENTS

| | | | |
|---|---|---|---|
| 3,242,293 | A | 3/1966 | Manecke |
| 3,276,599 | A | 10/1966 | Them |
| 3,900,238 | A | 8/1975 | Anderson |
| 3,992,608 | A | 11/1976 | Snavely |
| 4,191,444 | A | 3/1980 | Smith et al. |
| 4,365,228 | A | 12/1982 | Rowley |
| 4,399,971 | A | 8/1983 | Fehrmann et al. |
| 4,421,269 | A | 12/1983 | Ts'ao |
| 4,511,790 | A | 4/1985 | Kozak |
| 4,620,667 | A | 11/1986 | Vandermeyden et al. |
| 4,641,223 | A | 2/1987 | McIntosh |
| 4,657,215 | A | 4/1987 | Murphy |
| 5,023,432 | A | 6/1991 | Boykin et al. |
| 5,056,712 | A | 10/1991 | Enck |
| 5,103,078 | A | 4/1992 | Boykin et al. |
| 5,297,272 | A | 3/1994 | Lu et al. |
| 5,321,827 | A | 6/1994 | Lu et al. |
| 5,324,213 | A | 6/1994 | Frantz |
| 5,410,726 | A | 4/1995 | Baqai et al. |
| 5,490,279 | A | 2/1996 | Golbert et al. |
| 5,530,620 | A | 6/1996 | Sangveraphunsiri |
| 5,643,000 | A | 7/1997 | Dent |
| 5,761,518 | A | 6/1998 | Boehling et al. |
| 5,897,396 | A | 4/1999 | Maejima |
| 5,910,643 | A | 6/1999 | Laine et al. |
| 5,968,393 | A | 10/1999 | Demaline |
| 5,988,516 | A | 11/1999 | Gilmour |
| 6,068,447 | A | 5/2000 | Foege |
| 6,082,894 | A | 7/2000 | Batko et al. |
| 6,161,100 | A | 12/2000 | Saar |
| 6,216,956 | B1 | 4/2001 | Ehlers et al. |
| 6,265,699 | B1 | 7/2001 | Scott |
| 6,292,859 | B1 | 9/2001 | Santiago |
| 6,293,471 | B1 | 9/2001 | Stettin et al. |
| 6,308,009 | B1 | 10/2001 | Shellenberger et al. |
| 6,350,967 | B1 | 2/2002 | Scott |
| 6,375,087 | B1 | 4/2002 | Day et al. |
| 6,388,564 | B1 | 5/2002 | Piercy et al. |
| 6,389,226 | B1 | 5/2002 | Neale et al. |
| RE37,745 | E | 6/2002 | Brandt et al. |
| 6,520,122 | B2 | 2/2003 | Kemp et al. |
| 6,526,581 | B1 | 2/2003 | Edson |
| 6,633,726 | B2 | 10/2003 | Bradenbaugh |
| 6,795,644 | B2 | 9/2004 | Bradenbaugh |
| 6,860,432 | B2 | 3/2005 | Conover et al. |
| 6,869,313 | B2 | 3/2005 | Gibboney |
| 6,988,182 | B2 | 1/2006 | Teachman et al. |
| 6,989,514 | B2 | 1/2006 | Patterson et al. |
| 7,002,531 | B2 | 2/2006 | Koike |
| 7,030,343 | B2 | 4/2006 | Tran |
| 7,037,139 | B1 | 5/2006 | Stefaniu et al. |
| 7,065,431 | B2 | 6/2006 | Patterson et al. |
| 7,099,572 | B2 | 8/2006 | Phillips |
| 7,117,825 | B2 | 10/2006 | Phillips |
| 7,243,540 | B2 | 7/2007 | Merwin |
| 7,307,495 | B2 | 12/2007 | McLauchlan et al. |
| 7,346,274 | B2 | 3/2008 | Bradenbaugh |
| 7,942,851 | B2 | 5/2011 | Faries et al. |
| 2002/0008101 | A1 | 1/2002 | Hauschulz |
| 2003/0091091 | A1 | 5/2003 | Patterson et al. |
| 2003/0093185 | A1 | 5/2003 | Patterson et al. |
| 2003/0093186 | A1 | 5/2003 | Patterson et al. |
| 2003/0219999 | A1 | 11/2003 | Minich et al. |
| 2004/0069768 | A1 | 4/2004 | Patterson et al. |
| 2004/0079749 | A1 | 4/2004 | Young et al. |
| 2004/0123659 | A1 | 7/2004 | Merwin |
| 2004/0158361 | A1 | 8/2004 | Patterson et al. |
| 2004/0177817 | A1 | 9/2004 | Bradenbaugh |
| 2004/0225414 | A1 | 11/2004 | Patterson et al. |
| 2005/0043907 | A1 | 2/2005 | Eckel et al. |
| 2005/0231318 | A1 | 10/2005 | Bullington |
| 2005/0275993 | A1 | 12/2005 | Phillips |
| 2006/0047870 | A1 | 3/2006 | Phillips |
| 2006/0190141 | A1 | 8/2006 | Patterson et al. |
| 2006/0196206 | A1 | 9/2006 | Murray et al. |
| 2006/0257127 | A1 | 11/2006 | Patterson |
| 2007/0034169 | A1 | 2/2007 | Phillips |
| 2007/0183758 | A1 | 8/2007 | Bradenbaugh |
| 2007/0191994 | A1 | 8/2007 | Patterson et al. |
| 2007/0210067 | A1 | 9/2007 | Patterson et al. |
| 2007/0245980 | A1 | 10/2007 | Phillips |
| 2007/0246552 | A1 | 10/2007 | Patterson |
| 2007/0246556 | A1 | 10/2007 | Patterson |
| 2007/0246557 | A1 | 10/2007 | Phillips |
| 2007/0248143 | A1 | 10/2007 | Phillips |
| 2007/0248340 | A1 | 10/2007 | Phillips |
| 2008/0053699 | A1 | 3/2008 | Nakayama et al. |
| 2008/0293283 | A1 | 11/2008 | Tanaka et al. |
| 2009/0293816 | A1 | 12/2009 | Patterson |
| 2010/0082134 | A1 | 4/2010 | Phillips |

OTHER PUBLICATIONS

United States Patent Office Action for U.S. Appl. No. 11/201,665 dated Oct. 17, 2007 (13 pages).
United States Patent Office Action for U.S. Appl. No. 11/201,665 dated Mar. 17, 2008 (15 pages).
United States Patent Office Action for U.S. Appl. No. 11/201,665 dated Aug. 6, 2008 (19 pages).
United States Patent Office Action for U.S. Appl. No. 11/201,665 dated Jan. 14, 2009 (12 pages).
United States Patent Office Action for U.S. Appl. No. 11/432,103 dated Oct. 6, 2008 (9 pages).
United States Patent Office Action for U.S. Appl. No. 11/692,117 dated Sep. 11, 2009 (22 pages).
United States Patent Office Action for U.S. Appl. No. 11/692,117 dated Mar. 5, 2010 (26 pages).
United States Patent Office Action for U.S. Appl. No. 11/692,117 dated May 17, 2010 (3 pages).
United States Patent Office Action for U.S. Appl. No. 11/692,117 dated Aug. 25, 2010 (35 pages).
United States Patent Office Action for U.S. Appl. No. 11/692,130 dated Jun. 19, 2009 (9 pages).
United States Patent Office Action for U.S. Appl. No. 11/692,135 dated Feb. 19, 2010 (13 pages).
United States Patent Office Action for U.S. Appl. No. 11/692,135 dated Aug. 4, 2010 (15 pages).
United States Patent Office Action for U.S. Appl. No. 11/692,135 dated Dec. 3, 2010 (16 pages).
United States Patent Office Action for U.S. Appl. No. 11/692,135 dated Jan. 25, 2011 (15 pages).
United States Patent Office Action for U.S. Appl. No. 11/692,152 dated May 27, 2009 (7 pages).
United States Patent Office Action for U.S. Appl. No. 11/692,178 dated Jun. 22, 2010 (12 pages).
United States Patent Office Action for U.S. Appl. No. 11/692,179 dated Jun. 22, 2010 (16 pages).
United States Patent Office Action for U.S. Appl. No. 11/692,179 dated Dec. 6, 2010 (13 pages).
United States Patent Office Action for U.S. Appl. No. 11/692,179 dated May 23, 2011 (13 pages).
United States Patent Office Action for U.S. Appl. No. 11/692,179 dated Jun. 21, 2011 (12 pages).
United States Patent Office Action for U.S. Appl. No. 11/692,179 dated Mar. 29, 2012 (14 pages).
United States Patent Office Action for U.S. Appl. No. 11/692,179 dated Sep. 30, 2013 (8 pages).
United States Patent Office Action for U.S. Appl. No. 12/536,628 dated Apr. 15, 2011 (8 pages).
United States Patent Office Notice of Allowance for U.S. Appl. No. 12/536,628 dated Aug. 5, 2011 (2 pages).
United States Patent Office Action for U.S. Appl. No. 12/611,233 dated Oct. 18, 2010 (16 pages).
United States Patent Office Action for U.S. Appl. No. 12/611,233 dated Dec. 13, 2010 (4 pages).
United States Patent Office Action for U.S. Appl. No. 12/611,233 dated Mar. 30, 2011 (17 pages).
United States Patent Office Action for U.S. Appl. No. 12/611,233 dated Jun. 3, 2011 (4 pages).
United States Patent Office Examiner's Answer for U.S. Appl. No. 12/611,233 dated Oct. 19, 2011 (8 pages).

MODULAR CONTROL SYSTEM AND METHOD FOR WATER HEATERS

CROSS REFERENCE TO RELATED APPLICATIONS

This application is a continuation of and claims priority to U.S. patent application Ser. No. 11/692,182 entitled "Modular Control System And Method for Water Heaters" filed Mar. 27, 2007, which is incorporated herein by reference, and which is a continuation-in-part of and claims priority to U.S. patent application Ser. No. 11/201,665 entitled "Modular Control System And Method for Water Heaters" filed Aug. 11, 2005, and issued as U.S. Pat. No. 7,613,855, which is also incorporated herein by reference. The U.S. patent application Ser. No. 11/201,665 claims priority to U.S. Provisional Patent Application No. 60/604,689 filed Aug. 26, 2004, also incorporated herein by reference. The U.S. patent application Ser. No. 11/692,182 also claims priority to U.S. Provisional Application No. 60/908,132, entitled "Water Heating Systems and Methods" filed Mar. 26, 2007, and also incorporated herein by reference.

RELATED ART

Water heaters are often employed to provide users with heated water, which is drawn from a water tank and usually dispensed from a faucet, showerhead, or like device. During operation, a water heater tank normally receives unheated water from a water source, such as a water pipe. The tank includes a controller having a user interface that allows a user to set a desired temperature for the water being held by the tank. If the tank's water temperature falls below a lower temperature threshold, then the controller activates a heating element for warming the tank's water. When activated, the heating element begins to heat the water within the tank, and the heating element continues to heat the water until the water's temperature reaches or exceeds an upper temperature threshold.

Controllers for conventional water heaters are becoming increasingly sophisticated using more complicated algorithms for controlling heating elements and providing additional features, such as detection of dry fire conditions and other conditions pertinent to the operation of the water heater. Moreover, for different models of water heaters, manufacturers often install different controllers that provide different features. For example, for a standard water heater, a manufacturer may install a basic controller for providing basic functionality, such as a simple algorithm for controlling heating elements. However, for a higher-end water heater, the manufacturer may install a more sophisticated controller for providing additional features and/or better performance. Such a higher-end water heater can usually be sold at a higher price relative to lower-end or other standard water heaters.

A water heater manufacturer may have different assembly lines for different models of water heaters. Unfortunately, adding more assembly lines to accommodate different water heater models can significantly increase manufacturing costs since many assembly lines must be tooled with equipment separate from other assembly lines. Further, it is possible to retrofit one model of a water heater with a different controller after manufacturing in order to upgrade the water heater. In particular, depending on the configuration of the water heater, including the design of the current controller and the new controller, it is possible to remove the current controller and to replace it with a new controller that provides better functionality and/or more features. However, such retrofitting can be burdensome and problematic.

In addition, it is not always possible to replace a current controller with a new controller without damaging or significantly reconfiguring other portions of the water heater, such as the water tank and/or connections leading to the heating elements. Further, ensuring a reliable connection between the new controller and the heating elements can be particularly problematic, and retrofitting in general can be problematic if it is being performed by a consumer or unskilled technician who is unfamiliar with the design of the water heater.

Thus, better techniques for providing different models of water heaters at lower costs are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to systems and methods for enabling modular control of water heaters such that different models of water heaters can be efficiently provided. In this regard, a first control module is used to provide a first set of functionality and/or features for a water heater. If desired, a second control module can then be added to provide a second set of functionality and/or features for the water heater. Thus, the second control module, when added, essentially upgrades the water heater to make it more attractive to consumers that are willing to pay a higher price or fee for the second set of functionality and/or features enabled by the second control module. Moreover, enabling the water heater to be upgraded without removing the first control module can facilitate the upgrading process particularly for users who are unfamiliar with the design of the water heater.

Figure 1:
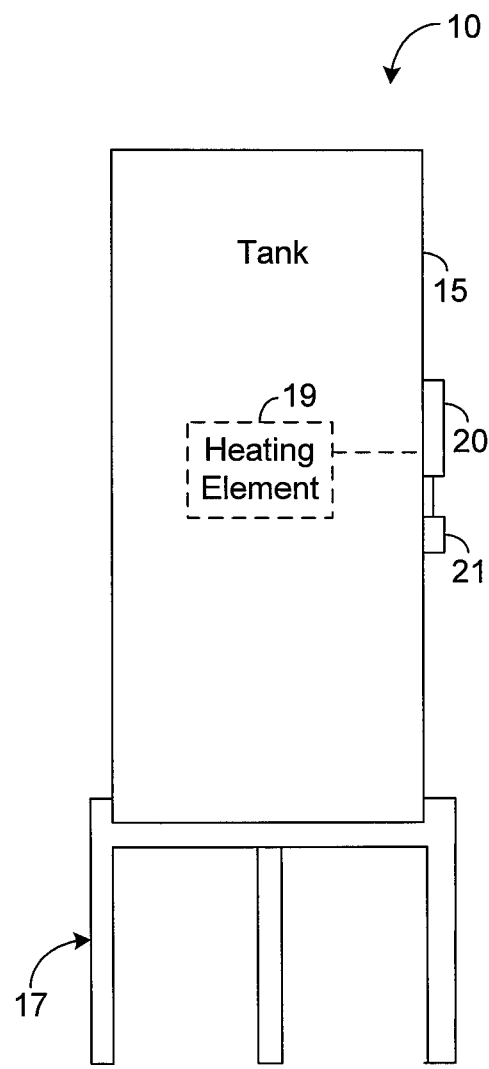
FIG. 1 is a block diagram illustrating an exemplary water heater in accordance with the present disclosure.

FIG. 1 depicts a water heater 10 comprising a tank 15 filled, at least partially, with water. In the embodiment shown by FIG. 1, the tank 15 is resting on a stand 17, although such a stand 17 is unnecessary in other embodiments. The water within the tank 15 can be heated by one or more heating elements 19 submerged within the water. Based on information from a temperature sensor 21, such as a thermistor, mounted on the tank 15, the operation of the heating element 19 is controlled by a control system 20, which is also mounted on the tank 15. It should be noted, however, that mounting of the control system 20 and/or temperature sensor 21 on the tank 15 is unnecessary, and the control system 20 and/or temperature sensor 21 may be positioned differently in other embodiments. Exemplary techniques for controlling the heating element 19 is described in U.S. patent application Ser. No. 10/772,032, entitled "System and Method for Controlling Temperature of a Liquid Residing within a Tank," and filed on Feb. 4, 2004, which is incorporated herein by reference.

Figure 2:
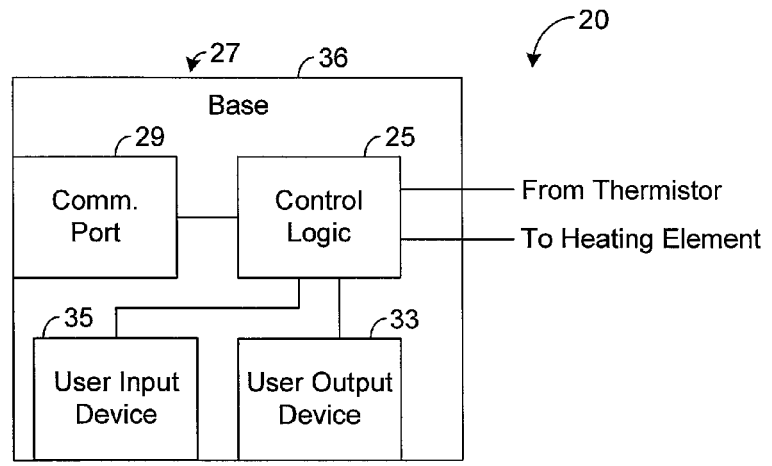
FIG. 2 is a block diagram illustrating an exemplary first controller for the water heater depicted in FIG. 1.

As shown by FIG. 2, the control system 20 comprises a controller 27 having control logic 25. A communication port 29 enables devices external to the controller 27 to communicate with the control logic 25. In one embodiment, the communication port 29 comprises a universal synchronous/asynchronous receive/transmit (USART) interface, such as for example, a serial RS232 interface, although other type of ports may be used in other embodiments. Indeed, in at least some other embodiments, the communication port 29 may enable wireless communication to allow the logic 25 to communicate with external devices via wireless signals. As an example, the communication port 29 may comprise an infrared transmitter and/or an infrared receiver, although other types of wireless transmitters and/or receivers may be used in other embodiments. The components of the controller 27 may be housed by one or more housing units (not specifically shown).

A user output device 33, such as for example one or more light emitting diodes (LEDs), a liquid crystal display (LCD) or other types of output devices, may be used to output data to a user. Further, a user input device 35, such as buttons or a keypad, for example, may be used to input data from a user. As shown by FIG. 2, the control logic 25, communication port 29, user output device 33, and user input device 35 may be integrally mounted on a base 36 so that the controller 47 forms a unitary structure.

The control logic 25 may be implemented in hardware, software, or a combination thereof. In an exemplary embodiment illustrated in FIG. 3, the control logic 25, along with its associated methodology, is implemented in software and stored in memory 39.

Note that the control logic 25, when implemented in software, can be stored and transported on any computer-readable medium for use by or in connection with an instruction execution system or device, such as a computer-based system, processor-containing system, or other system or device that can fetch and execute instructions. In the context of this document, a "computer-readable medium" can be any means that can contain, store, communicate, propagate, or transport a program for use by or in connection with an instruction execution system or device. The computer readable-medium can be, for example but not limited to, an electronic, magnetic, optical, electromagnetic, infrared, or semiconductor device or propagation medium.

Figure 3:
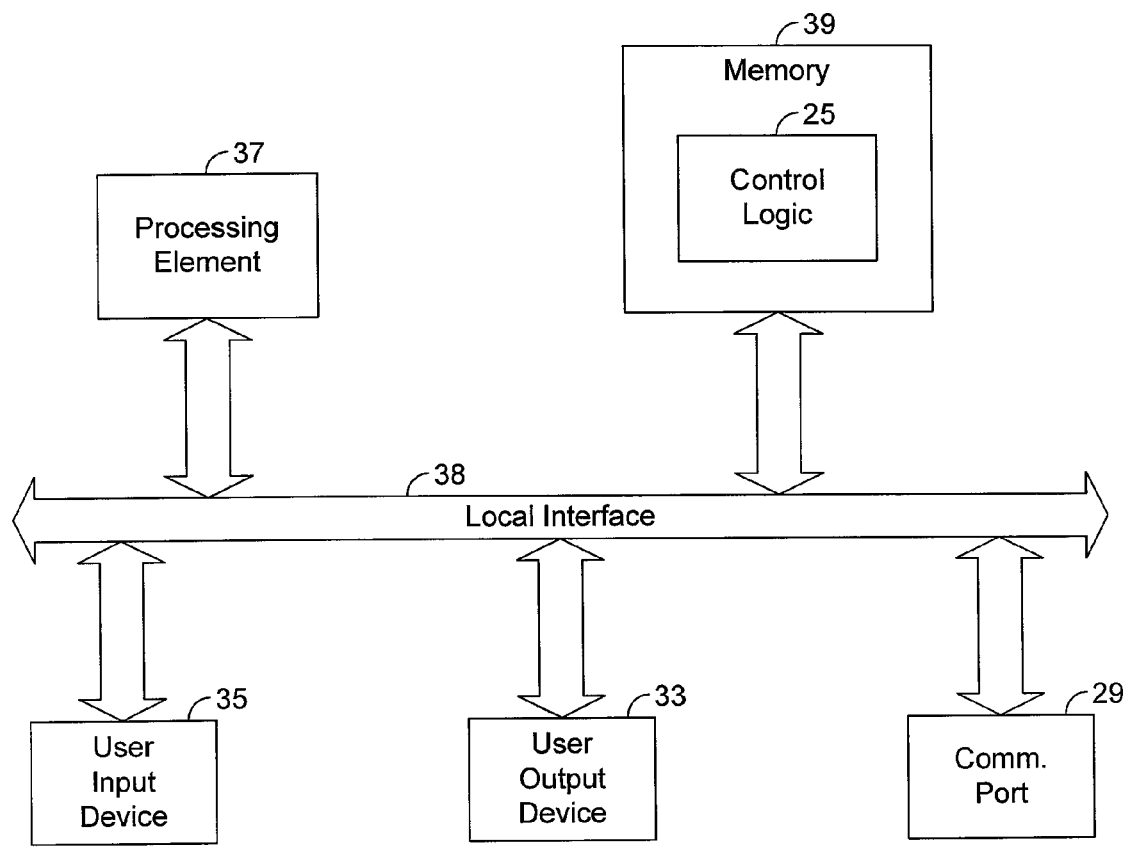
FIG. 3 is a block diagram illustrating the controller of FIG. 2.

The exemplary embodiment of the controller 27 depicted by FIG. 3 comprises at least one conventional processing element 37, such as a digital signal processor (DSP) or a central processing unit (CPU), that communicates to and drives the other elements within the controller 27 via a local interface 38, which can include at least one bus. Indeed, when the control logic 25 is implemented in software, the processing element 37 can fetch and execute instructions from the control logic 25 to implement the functionality of the control logic 25, as is described herein.

The control logic 25 is configured to control the operation of the heating element 19 (FIG. 1) in accordance with at least one algorithm. As an example, the control logic 25 may receive inputs from the temperature sensor 21 to determine a temperature of the water within the tank 15. The control logic 25 may then activate the heating element 19 when the temperature falls below a first specified threshold and deactivate the heating element 19 when the temperature rises above a second specified threshold. Other techniques for controlling the heating element 19 are disclosed in U.S. patent application Ser. No. 10/772,032, as well as U.S. Provisional Application No. 60/579,757, entitled "System and Method for Detecting Failure of a Relay-Based Circuit," and U.S. Provisional Application No. 60/584,401, entitled "Apparatus and Method for Fluid Temperature Control," which are all incorporated herein by reference. As indicated by these other applications, the logic 25 may be configured to perform other functionality, such as for example, testing for dry fire conditions, adaptively adjusting a hysteresis of the heating element 19, and performing diagnostic functions, such as detecting a failure or imminent failure of the heating element 19. In addition, the controller 27 may be configured in accordance with U.S. patent application Ser. No. 11/692,117, entitled "Water Hearing Systems and Methods," and filed on Mar. 27, 2007, which is incorporated herein by reference.

Figure 4:
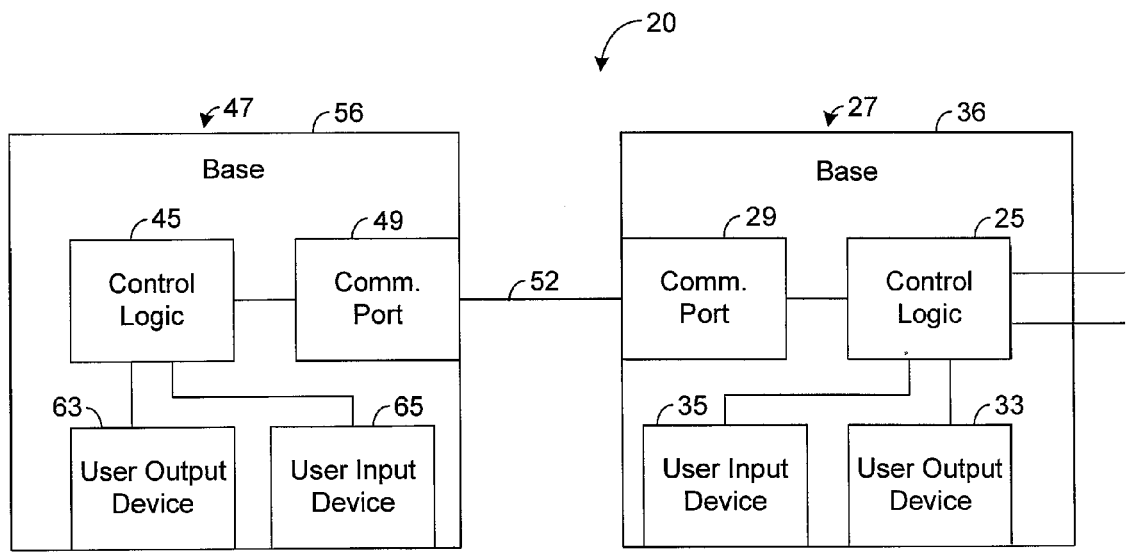
FIG. 4 is a block diagram illustrating an exemplary second controller interfaced with the first controller of FIG. 2.

In one embodiment, control logic 45 of a second controller 47 may be interfaced with the control logic 25, as shown by FIG. 4. Such control logic 45 may be housed within one or more housing units separate from the housing unit or units of the control logic 25.

In the embodiment shown by FIG. 4, the controller 47 comprises a communication port 49 that is coupled to the communication port 29 of controller 27 by a conductive connection 52. Thus, the control logic 45 of controller 47 is able to communicate with the control logic 25 of controller 27 via the conductive connection 52 and communication ports 29 and 49. The controller 47 may be mounted on the tank 15 and/or the controller 27. Alternatively, the controller 47 may be located remotely from the tank 15. In such an embodiment, the connection 52 may extend from the port 29 to the port 49, or wireless signals may be communicated between the ports 29 and 49.

The control logic 45 is configured to control the operation of the heating element 19 and/or provide other functions, such as those described in the aforementioned patent applications. Further, the control logic 45 may be implemented in hardware, software, or a combination thereof. In an exemplary embodiment illustrated in FIG. 5, the control logic 45, along with its associated methodology, is implemented in software and stored in memory 59.

Note that the control logic 45, when implemented in software, can be stored and transported on any computer-readable medium for use by or in connection with an instruction execution system or device, such as a computer-based system, processor-containing system, or other system or device that can fetch and execute instructions. In addition, the exemplary embodiment of the controller 47 depicted by FIG. 5 comprises at least one conventional processing element 57, such as a digital signal processor (DSP) or a central processing unit (CPU), that communicates to and drives the other elements within the controller 47 via a local interface 58, which can include at least one bus. Indeed, when the control logic 45 is implemented in software, the processing element 57 can fetch and execute instructions from the control logic 45 to implement the functionality of the control logic 45, as is described herein.

The control logic 45 may control components, such as heating elements, directly or may exercise such control in conjunction with the control logic 25. As an example, the control logic 25 may be configured to control the operation of the heating element 19 according to a particular algorithm, such as one of the algorithms described in the aforementioned patent applications. The control logic 45, on the other hand, may be configured to control the operation of the heating element 19 according to a different algorithm, such as another algorithm described in the aforementioned patent applications. Thus, the control of the water heater 10 is modular in that separate logic 25 and/or 45 may be selectively used separately or in conjunction with one another to control one or more functions of the water heater 10.

As with the control logic 25, the control logic 45 of controller 47 may be used to control various functions in addition to or in lieu of operational control of heating elements, such as for example, testing for dry fire conditions, adaptively adjusting a hysteresis of a heating element, and performing diagnostic functions, such as detecting a failure or imminent failure of a heating element. A user output device 63, such as an LED or LCD, for example, may be used by the control logic 45 to output information to a user. Further, a user input device 65, such as buttons or a keypad, for example, may be used to input data from a user. As shown by FIG. 4, the control logic 45, communication port 49, user output device 63, and user input device 65 may be integrally mounted on a base 56 so that the controller 47 forms a unitary structure.

In one embodiment, the operation of the heating element 19 is controlled by one of the control logic 25 or 45 depending on the desired configuration of the water heater 10. For example, if the controller 47 is not interfaced with the controller 27 or is not operational, then the control logic 25 may control the operation of the heating element 19 according to a first algorithm. Otherwise, the control logic 45 may control the operation of the heating element 19 according to a second algorithm.

The modular approach to controlling the water heater 10 may be used to efficiently provide users with different feature operations. For example, a manufacturer of water heaters 10 could manufacture a large number of water heaters having the controller 27 and not the controller 47. The controller 27 could provide a basic set of functionality, such as simple algorithms for controlling the heating element 19. Further, the output device 33 could comprise low cost components, such as LEDs. If, however, a user of a particular one of the manufactured water heaters 10 desires a higher-end type of water heater, then the controller 47 could be introduced to provide additional and/or better features.

For example, the control logic 45 could utilize one or more better algorithms for controlling the heating element 19. As a further example, the control logic 45 could utilize an algorithm that tracks a usage history of the water tank or heating element 19 and efficiently control the heating element 19 based on this history as described by U.S. patent application Ser. No. 10/772,032. Also, the output device 63 may provide better components as compared to output device 33. For example, a sophisticated LCD screen may be used to provide output for the device 63 whereas LEDs may be used to provide output for the device 33. As an example, a screen of the device 63 may convey textual messages, and if a heating element failure or other event is detected, the screen of device 63 may provide a message explaining the event that has been detected. Such a screen may also provide information about the thresholds, also referred to as "set points," that are used to control the heating element 19, as well as information about the detected water temperature. The output device 63 may also be configured to provide audible indications, such as beeps or pre-recorded messages, that the output device 33 may be incapable of providing.

Moreover, by installing or otherwise introducing the controller 47, the water heater 10 can essentially be upgraded to a more desirable model. Thus, a manufacturer or retailer is able to efficiently upgrade the water heater 10 to a more desirable or expensive model by merely providing the controller 47 to the customer that is purchasing the water heater 10. Further, different models of the controller 47 may be available such that a user can easily select a particular set of features to which he would like to upgrade.

In addition, a manufacturer may elect to use low cost components for the controller 27. For example, if the control logic 25 and 45 are implemented in software, then a low cost processing element 37 may be selected for executing the instructions of the logic 25. However, the logic 45 may be configured to utilize a more sophisticated algorithm that requires more processing power or speed than that provided by the processing element 37 selected for controller 27. Thus, a more expensive processing element 57 may be selected for the controller 47.

Moreover, the manufacturer can use low cost components to initially manufacture the water heater 10, and the manufacturer or retailer could bear the cost of the higher cost or additional components of the controller 47 only for the upgraded units, which would likely command a higher purchase price or an additional fee after the initial purchase. Thus, for units that are not to be sold with the controller 47, it is unnecessary for the manufacturer to utilize higher cost components that are not needed for operation of this controller 47. Such a feature could help to reduce the cost of the non-upgraded water heaters, in particular, since it is unnecessary for such components to fully support the functionality provided by the controller 47. In this regard, components for supporting the functionality of the controller 47 may be within the controller 47 and interfaced with the controller 27 at the time of the upgrade. Thus, the non-upgraded water heaters 10 are able to have a relatively low cost structure yet have the capability of easily and efficiently upgrading to higher performance.

An exemplary use of a water heater 10 in accordance with an embodiment of the present disclosure will be described hereafter.

For illustrative purposes, assume that the control logic 25 is configured to control the heating element 19 in accordance with a first algorithm, referred to as hereafter as the "user-specified threshold algorithm." In this regard, the control logic 25 is configured to establish an upper threshold and a lower threshold based on user inputs specifying such thresholds. If the control logic 25 determines that water within the tank 15 falls below the lower threshold, the control logic 25 activates the heating element 19 such that it begins to heat water within the tank 15. If the control logic 25 determines that water within the tank 15 rises above the upper threshold, the control logic 25 deactivates the heating element 19 such that it is prevented from heating water within the tank 15 until the element 19 is later activated. Such a user-specified threshold algorithm has been used to control many conventional water heaters.

For illustrative purposes, also assume that the control logic 45 is configured to control the heating element 19 based on a second algorithm, referred to herein as the "usage history algorithm." In this regard, the control logic 45 is configured to activate and deactivate the heating element 19 based on whether water temperature within the tank 15 exceeds upper and lower thresholds, as described above for the user-specified threshold algorithm. However, the control logic 45 is configured to automatically track usage of the heating element 19 over time and to automatically select the upper and lower thresholds based on the heating element's usage history. Exemplary techniques for tracking usage of the heating element 19 and for selecting thresholds based on the tracked usage are described in more detail in U.S. patent application Ser. No. 10/772,032 and other applications previously referenced herein. Note that the user-specified threshold algorithm and the usage history algorithm are described herein for illustrative purposes, and the control logic 25 and 45 may be configured to employ other algorithms in other embodiments.

For illustrative purposes, also assume that the control logic 25 is configured to detect a dry fire condition, which is a condition that exists when the heating element 19 is activated without being submerged in water. Exemplary techniques for detecting a dry fire condition are described in more detail in U.S. patent application Ser. No. 11/117,069, entitled "Water Heating System and Method for Detecting a Dry Fire Condition for a Heating Element," and filed on Apr. 28, 2005, which is incorporated herein by reference.

Further assume that the user output device 33 comprises an LED (not specifically shown), referred to hereafter as the "dry fire LED," which is illuminated by the control logic 25 upon detection of a dry fire condition. Thus, illumination of the dry fire LED indicates that a dry fire condition has been detected. In other examples, the foregoing LED may be used to indicate the occurrences of other events.

In addition, assume that the user output device 63 comprises an LCD for displaying textual messages. It should be noted that the foregoing assumptions are made so that an exemplary operation and use of the water heater 10 can be presented. None of the foregoing assumptions are essential to the present disclosure and may be changed for other examples.

Figure 6:
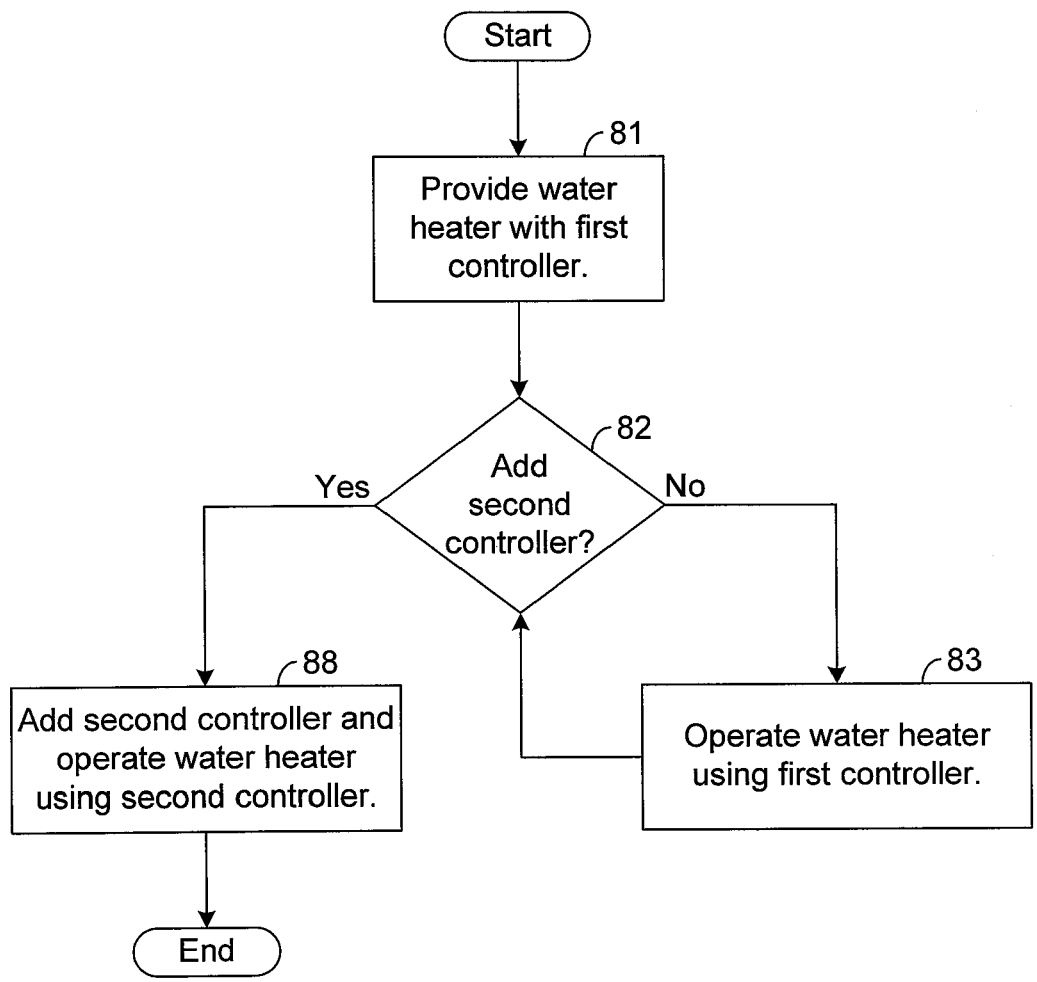
FIG. 6 is a flow chart illustrating an exemplary use of the water heater depicted in FIG. 1.

Initially, the water heater system 10 is manufactured or otherwise provided with the controller 27 mounted on the tank 15, as shown by block 81 of FIG. 6. Notably, controller 47 is absent from the water heater 10 and, therefore, may not be used to control the heating element 19 or provide other features with the water heater 10 until the controller 47 is later added, as will be described in more detail hereafter.

Assume that a consumer purchases the water heater 10 and decides to not purchase or add the controller 47. Thus, the consumer begins to use the water heater 10 without the controller 47, as indicated by blocks 82 and 83 of FIG. 6. In such an example, the control logic 25 controls the heating element 19 in accordance with the user-specified threshold algorithm. Further, the control logic 25 checks for dry fire conditions and illuminates the dry fire LED of user output device 33 if such a condition is detected. Of course, for such an illumination to be useful, the consumer or other user of the water heater 10 must be aware that illumination of the dry fire LED indicates an occurrence of a dry fire condition.

At some point, the consumer may desire to upgrade the water heater 10. Thus, the consumer may purchase or otherwise obtain the controller 47 and interface it with the controller 27, as shown by blocks 82 and 88 of FIG. 6. In one embodiment, the foregoing is accomplished by mounting the controller 47 on the controller 27 such that the communication port 49 is detachably coupled to the communication port 29. However, other techniques may be used in other embodiments to interface the controllers 27 and 47. For example, it is possible for the interfacing to be done by placing the controller 47 in close proximity with the controller 27 such that wireless signals can be communicated therebetween.

Once the controllers 27 and 47 are interfaced, the control logic 45 begins monitoring the heating element 19 to define a usage history of the element 19. Various techniques may be employed to monitor the usage of the heating element 19. For example, when the controllers 27 and 47 are interfaced, the control logic 25 may be configured to notify the control logic 45 each time the heating element 19 is activated or deactivated. Based on these notifications, the control logic 45 can define the heating element's usage history.

Based on the usage history, the control logic 45 determines upper and lower thresholds and begins controlling the heating element 19 according to the usage history algorithm. In this regard, when the control logic 45 is ready to start controlling the heating element 19 via the usage history algorithm, the control logic 45 communicates, to the control logic 25, a command to disable the control logic 25 from continuing to control the heating element 19 according to the user-specified threshold algorithm. Then, the control logic 45 begins controlling the heating element 19 via the usage history algorithm. There are various methodologies that may be used to control the heating element 19 according to the usage history algorithm.

For example, the control logic 45 may determine when to activate and deactivate the heating element 19 and instruct the control logic 25 to activate and deactivate the heating element 19 accordingly. To enable such a determination, the control logic 25 may periodically communicate temperature information from the temperature sensor 21 to the control logic 45. In other embodiments, the communication port 49 may be coupled directly to the connections leading to the heating element 19 and/or the temperature sensor 21, and the control logic 45 may be configured to control the heating element 19 directly without the use of control logic 25. In yet another embodiment, the control logic 45 may communicate the appropriate upper and lower thresholds to the control logic 25. The control logic 25 may then control the heating element 19 using these thresholds instead of the user defined thresholds previously employed by the control logic 25. In such an embodiment, both the control logic 45 and the control logic 25 jointly control the heating element 18 accordingly to the usage history algorithm. Various other techniques may be employed to enable the control logic 45 to control the heating element 19 according to the usage history algorithm.

If a dry fire condition occurs once the controller 47 is interfaced with the controller 27, the control logic 25 preferably notifies the control logic 45 of the detected dry fire condition. The control logic 45 then displays a textual message via the LCD of the user output device 63. The textual message may indicate that a dry fire condition has been detected and possibly provide general information about dry fire conditions so that the user can be more informed about the detected problem. Note that, if desired, the control logic 25 may be configured to illuminate the dry fire LED of the user output device 33 even after the controller 47 is interfaced with the controller 27.

Although the control logic 25 is described above as detecting possible dry fire conditions after the controllers 27 and 47 are interfaced, such a feature is unnecessary. For example, the communication port 49 may be coupled directly to the connections leading to the temperature sensor 21 and the heating element 19. In such an embodiment, operation of the control logic 25 may be disabled such that the control logic 25 no longer operates as long as the controllers 27 and 47 are interfaced or as long as the control logic 45 is actively disabling the control logic 25. Indeed, the control logic 45 may receive temperature information from the temperature sensor 21 and detect dry fire conditions and/or other conditions without any use of the control logic 25. Further, the control logic 45 may control the activation state of the heating element 19 without any use of the control logic 25. Moreover, components of or associated with the control logic 25, such as the processing element 37, may be powered down while the control logic 25 is disabled.

It should be noted that controller 27 is described above as using a different algorithm for controlling the heating element 19 relative to the controller 47. Such a feature is unnecessary. For example, it is possible for controllers 27 and 47 to use the same algorithm or for the controller 27 to continue controlling the heating element 19 via the same algorithm after the controllers 27 and 47 are interfaced. In such embodiments, the controller 47 may be different than controller 27 in other ways, such as by employing different user output components or providing functions that are not provided by the controller 27.

Figure 7:
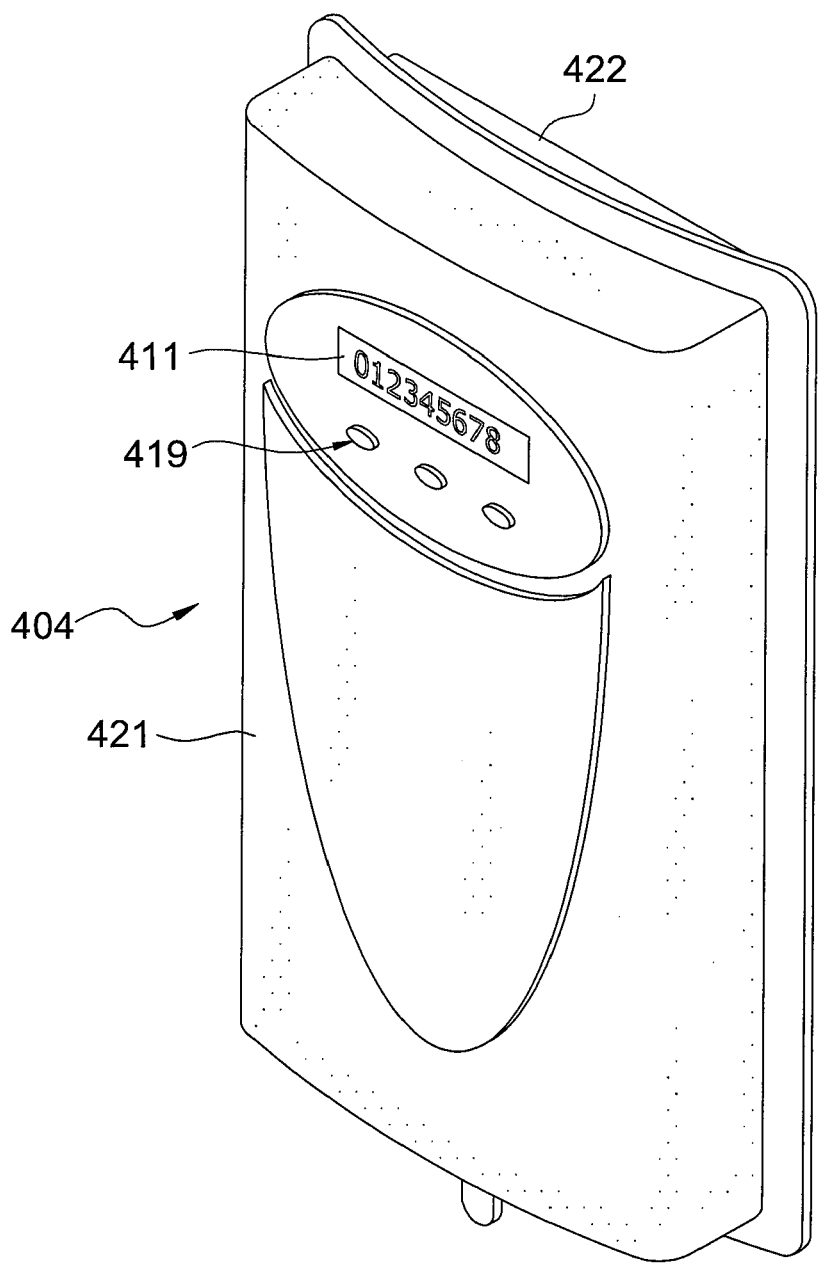
FIG. 7 is a three-dimensional perspective of an exemplary housing that may be used to house a controller, such as is depicted in FIG. 5.

FIG. 7 illustrates an exemplary housing 404 for the additional controller 47. Components of the controller 47 may be housed within and protected by the housing 404. As shown by FIG. 7, a display 411, such as a liquid crystal display, is coupled to the housing 404 so that a user can see information displayed by the controller 47. Further, one or more buttons 419 allows a user to submit inputs to the controller 47, although other types of user interfaces may be employed in other embodiments.

Figure 8:
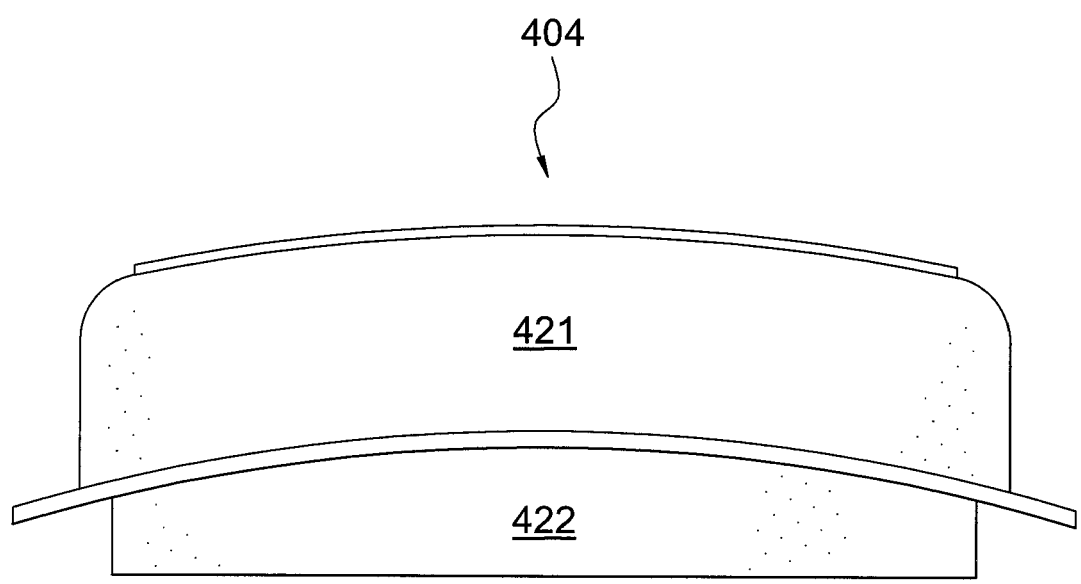
FIG. 8 is a top view of the housing depicted in FIG. 7.
Figure 9:
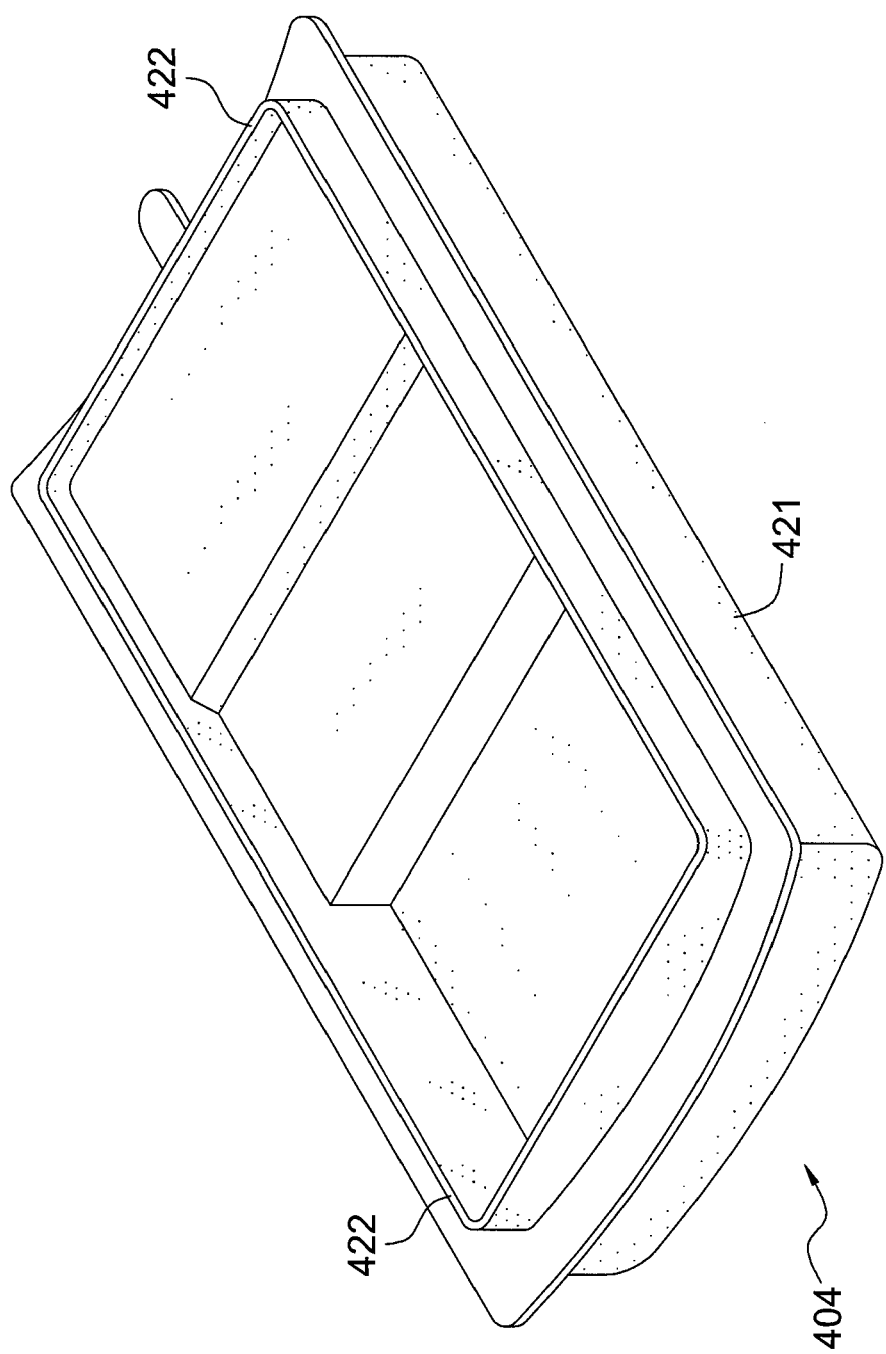
FIG. 9 is a back view of the housing depicted in FIG. 7.

As shown by FIGS. 7-9, the exemplary housing 404 has an exterior cover 421 and an interior rim 422. The exterior cover 421, as shown by FIG. 8, has a radius of curvature consistent with that of the tank 53 so that the cover 421 can fit flush with the wall of the tank 53 when the controller 47 is mounted on the tank 53. Moreover, most conventional tanks have a rectangular shaped compartment, in which the water heater controller and the base of a heating element can reside. The rim 422 is preferably shaped so that it fits within the compartment and the exterior wall of the rim 422 contacts the wall of the compartment and is flush with the wall of the compartment along a perimeter of the compartment. In such an example, the housing 404, along with the controller 47, which is housed by the housing 404, can cover the controller 52. Various other configurations of the housing 404 are possible in other embodiments.

Figure 10:
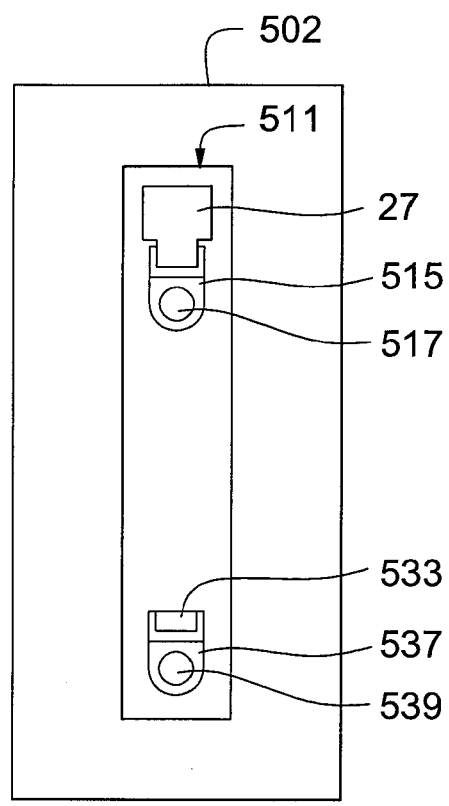
FIG. 10 is a side view of an exemplary water heater tank on which a controller, such as is depicted in FIG. 3, is mounted.

FIG. 10 shows an exemplary tank 502 of a water heating system, such as is described in U.S. patent application Ser. No. 11/692,117. The tank 502 has a compartment 511 in which the controller 27 may reside. In this regard, the controller 27 is mounted on a bracket 515 through which a base 517 of a heating element passes. The bracket 515 can be any known or future-developed bracket for holding water heater controllers. An exemplary bracket 517 is described in U.S. patent application Ser. No. 11/692,117.

As shown by FIG. 10, a temperature sensor holding apparatus 533 also resides in the compartment 511. The apparatus 553 is mounted on a bracket 537 through which a base 539 of another heating element passes. The bracket 537 may be similar or identical to the bracket 515. An exemplary temperature sensor holding apparatus 533 is described in U.S. patent application Ser. No. 11/692,117.

Figure 11:
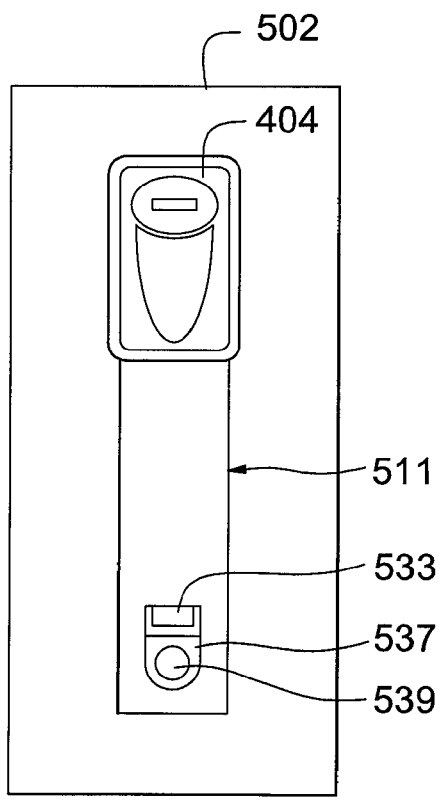
FIG. 11 is a side view of the water heater tank of FIG. 10 after the housing of the FIG. 7 has been mounted on the tank.

As shown by FIG. 11, the housing 404, which houses the controller 47 of FIG. 4, may be mounted on tank 502 and cover the controller 27. In this regard, the rim 422 (not shown in FIG. 11) may pass into the compartment such that frictional forces hold the housing 404 in place. In other embodiments, other types of housings and other techniques for mounting a housing to the tank 502 may be employed.

Figure 5:
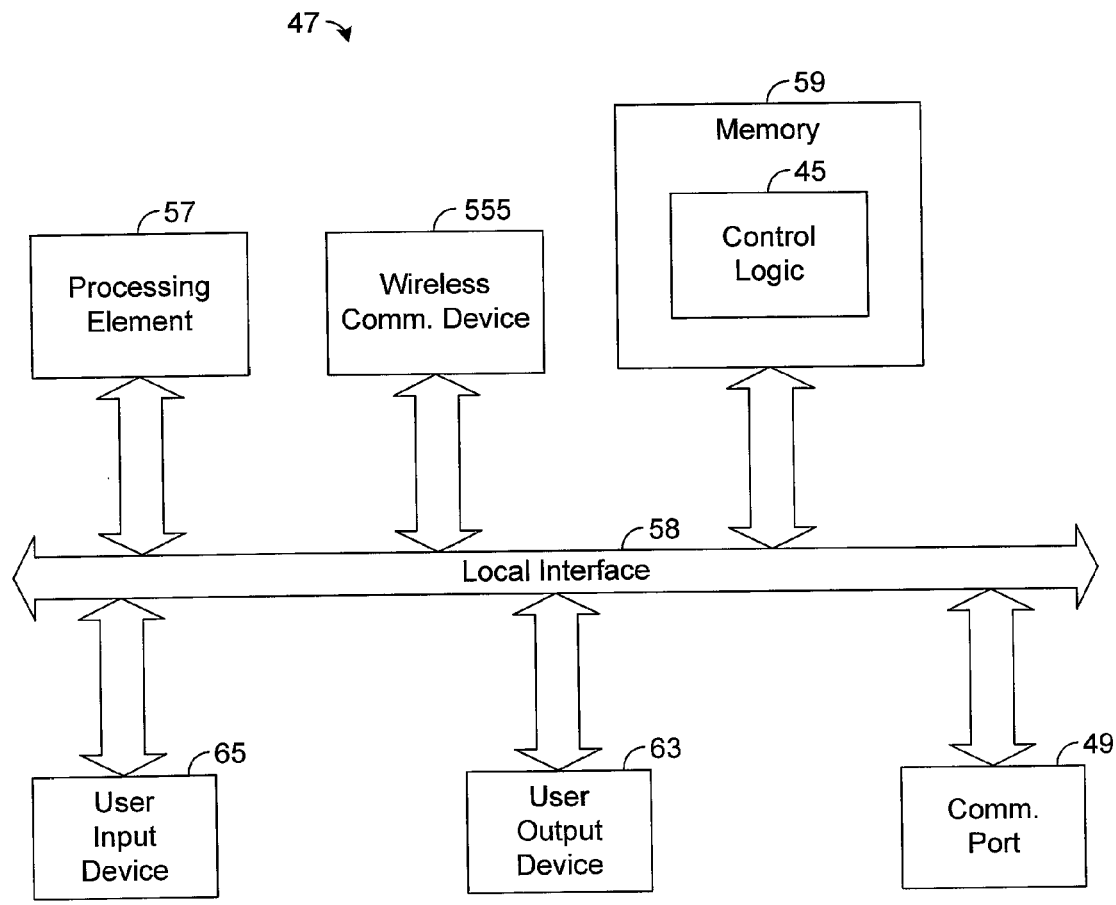
FIG. 5 is a block diagram illustrating the second controller of FIG. 4.

In one exemplary embodiment, as shown by FIG. 5, the controller 47 comprises a wireless communication device 555 for enabling the controller 47 to communicate with a remote device. For example, the wireless communication device 55 may enable the control logic 45 to communicate with a remote user interface (not shown) for receiving user inputs and/or providing user outputs.

In one exemplary embodiment, the controller 27 is not equipped with a wireless communication device. Thus, to establish a set point, a user may provide an input via user input device 35 of controller 27. However, in such an example, a user may be required to be present at the controller 27. By adding the controller 47, wireless communication with the remote user interface may be enabled so that a user does not need to be present at the controller 27 to provide inputs, such as establishing a set point, or receive information about the operation of the system 10.

In this regard, a user may provide an input for establishing a set point to a remote user interface, which transmits data indicative of the input to the controller 47 via wireless communication device 555. The control logic 45 may then establish the set pint based on the data and/or communicate the data to the controller 27 so that the control logic 25 may establish the set point. In another example, information about a temperature sensed by a temperature sensor may be transmitted to the controller 47. The control logic 45 may then wirelessly transmit such information to a remote user interface via the wireless communication device 555, and the remote user interface may display or otherwise convey the information to a user. In other examples, the wireless communication device 555 may communicate other types of information and/or enable other types of functions.

Note that is unnecessary for the controller 47 to directly control the operation of the heating elements. For example, the controller 47 may simply be sued to display data and/or receive inputs in one embodiment. In another embodiment, the controller 47 may only be used to communicate wireless data. Moreover, the controller 47 may be configured to perform any number of functions in addition to or in lieu of the controller 27.

What is claimed is:

1. A water heating system having a modular control system, comprising:
   a tank;
   a heating element supported by the tank;
   a first controller supported by the tank, the first controller coupled to the heating element, the first controller including logic to activate and deactivate the heating element according to a first threshold value; and
   a second controller selectively coupled to the first controller and configured to
      communicate the first threshold value to the first controller, and
      perform an additional function related to the operation of the water heater; and
   wherein the first controller is configured to control the heating element mounted on the water heating system in an absence of the second controller.

2. The water heating system of claim 1, wherein the second controller is configured to receive information from a user for determining the first threshold value.

3. The water heating system of claim 1, wherein the second controller is configured to determine the first threshold value based on a first algorithm.

4. The water heating system of claim 3, wherein the first algorithm includes a usage history algorithm that determines the first threshold value and a second threshold value based on the usage history of the heating element.

5. The water heating system of claim 4, wherein the second controller is configured to communicate with the first controller the second threshold value, and wherein the first controller activates and deactivates the heating element based on the first threshold value and the second threshold value.

6. The water heating system of claim 1, wherein the second controller includes a display.

7. The water heating system of claim 1, wherein the additional function performed by the second controller includes storing activation and deactivation information of the heating element.

8. The water heating system of claim 1, wherein the first controller is configured to communicate information pertaining to the activation and deactivation of heating element to the second controller.

9. The water heating system of claim 1, wherein the first controller and the second controller communicate wirelessly.

10. The water heating system of claim 1, wherein the first controller has a first housing that covers components of the first controller, and wherein the second controller has a second housing, separate from the first housing, covering components of the second controller.

11. The water heating system of claim 1, wherein the second controller is configured to send a wireless command to the first controller instructing the first controller when to activate the heating element.

12. The water heating system of claim 1, wherein the second controller is not directly coupled to the heating element.

13. The water heating system of claim 1, wherein the second controller is located remotely from the tank.

14. The water heating system of claim 1, wherein the second controller is selectively physically coupled to the first controller.

15. The water heating system of claim 1, wherein the first controller includes an input device that is configured to receive information regarding the first threshold value.

16. A water heating system having a modular control system, comprising:

a tank;
one or more heating elements mounted on the water heating system;
a first controller mounted on the tank and having a first communication port, the first communication port having a first wireless transceiver, and the first controller including logic for activating and deactivating all of the one or more heating elements mounted on the water heating system based on a first threshold; and
a second controller selectively coupled to the first controller via the first communication port, the second controller configured to wirelessly send information regarding the first threshold to the first controller,
wherein the first controller is configured to wirelessly communicate information regarding the activation and deactivation of the one or more heating elements to the second controller, and
wherein the first controller is configured to control the activation and deactivation of all the one or more heating elements in the absence of the second controller.

17. The water heating system of claim 16, wherein the second controller has logic configured to receive, via a wireless communication device, data indicative of an input for establishing a set point to be used for determining the first threshold.

18. The water heating system of claim 17, wherein the logic of the second controller is configured to transmit, via the wireless communication device, information pertaining to operation of the water heating system to a remote device.

19. The water heating system of claim 16, wherein the first controller has a first housing that covers components of the first controller, and wherein the second controller has a second housing, separate from the first housing, covering components of the second controller.

20. The water heating system of claim 19, wherein the tank has a compartment, wherein the first controller resides in the compartment, and wherein the second housing has a rim inserted into the compartment and contacting a wall of the tank defining the compartment.

* * * * *